US008781631B2

United States Patent
Li et al.

(10) Patent No.: US 8,781,631 B2
(45) Date of Patent: Jul. 15, 2014

(54) ROBOT ARM AND DETECTING DEVICE HAVING SAME

(75) Inventors: Shen-Chun Li, New Taipei (TW); Chun-Neng Liao, New Taipei (TW); Shou-Kuo Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 249 days.

(21) Appl. No.: 13/181,462

(22) Filed: Jul. 12, 2011

(65) Prior Publication Data

US 2012/0296473 A1 Nov. 22, 2012

(30) Foreign Application Priority Data

May 18, 2011 (TW) .............................. 100117482 A

(51) Int. Cl.
*G05B 15/00* (2006.01)
*G05B 19/00* (2006.01)

(52) U.S. Cl.
USPC ........................................................ 700/259

(58) Field of Classification Search
USPC ................................. 700/245–264
See application file for complete search history.

(56) References Cited

U.S. PATENT DOCUMENTS

| 4,146,924 | A | * | 3/1979 | Birk et al. ..................... 700/259 |
| 4,492,847 | A | * | 1/1985 | Masaki et al. ............ 219/124.34 |
| 4,635,206 | A | * | 1/1987 | Bhatia et al. .................. 700/183 |
| 4,912,388 | A | * | 3/1990 | Tanaka et al. ................. 318/640 |
| 4,969,108 | A | * | 11/1990 | Webb et al. .................... 700/259 |
| 6,430,472 | B1 | * | 8/2002 | Boillot et al. ................. 700/245 |

FOREIGN PATENT DOCUMENTS

EP 0260984 A2 3/1988
JP 2008-281535 A 11/2008

* cited by examiner

*Primary Examiner* — Khoi Tran
*Assistant Examiner* — Rachid Bendidi
(74) *Attorney, Agent, or Firm* — Novak Druce Connolly Bove + Quigg LLP

(57) ABSTRACT

A robot arm includes a support arm, an adjusting rod and a detecting unit. The adjusting rod rotatably extends through the support arm. The detecting unit is attached to the adjusting rod. The detecting unit includes an image capture device and a probe device. The image capture device captures images of a workpiece. The probe device includes a driving device and a probe. The driving device may drive the probe to move between a first position where the probe does not visually prevent images of the workpiece being captured by the image capture device, and a second position where the probe does block the images of the workpiece being captured by the image capture device.

10 Claims, 7 Drawing Sheets

ROBOT ARM AND DETECTING DEVICE HAVING SAME

BACKGROUND

1. Technical Field

The present disclosure relates to robot arms and detecting devices having the robot arms.

2. Description of Related Art

Robot arms are used widely in many industries. To add functions, various functional devices are attached to the robot arm correspondingly. However, one functional device has to be detached from the robot arm first, and then another functional device is attached to the robot arm, this is inconvenient and time-consuming.

Therefore, a robot arm and a detecting device having the robot arm, which can overcome the limitations described, are needed.

DETAILED DESCRIPTION

Figure 1:
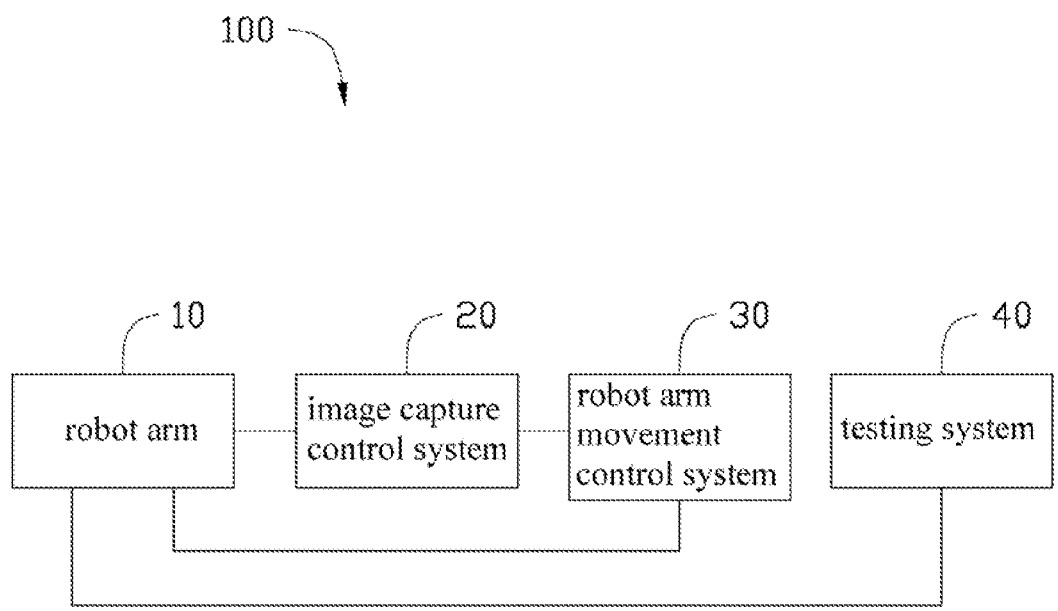
FIG. 1 is a functional block diagram of a detecting device including a robot arm, according to an exemplary embodiment.
Figure 2:
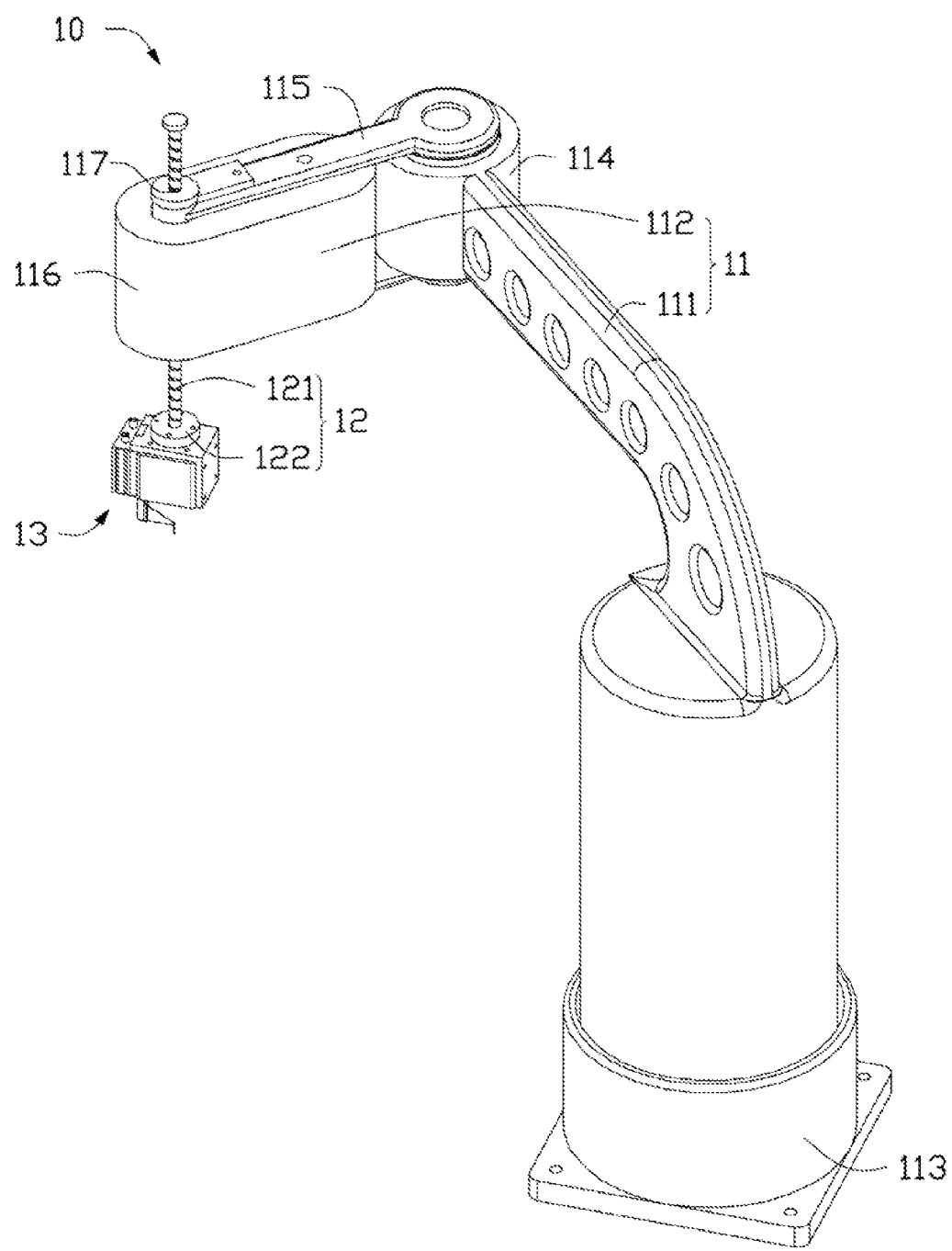
FIG. 2 is a schematic view of the robot arm including a detecting unit of FIG. 1.
Figure 3:
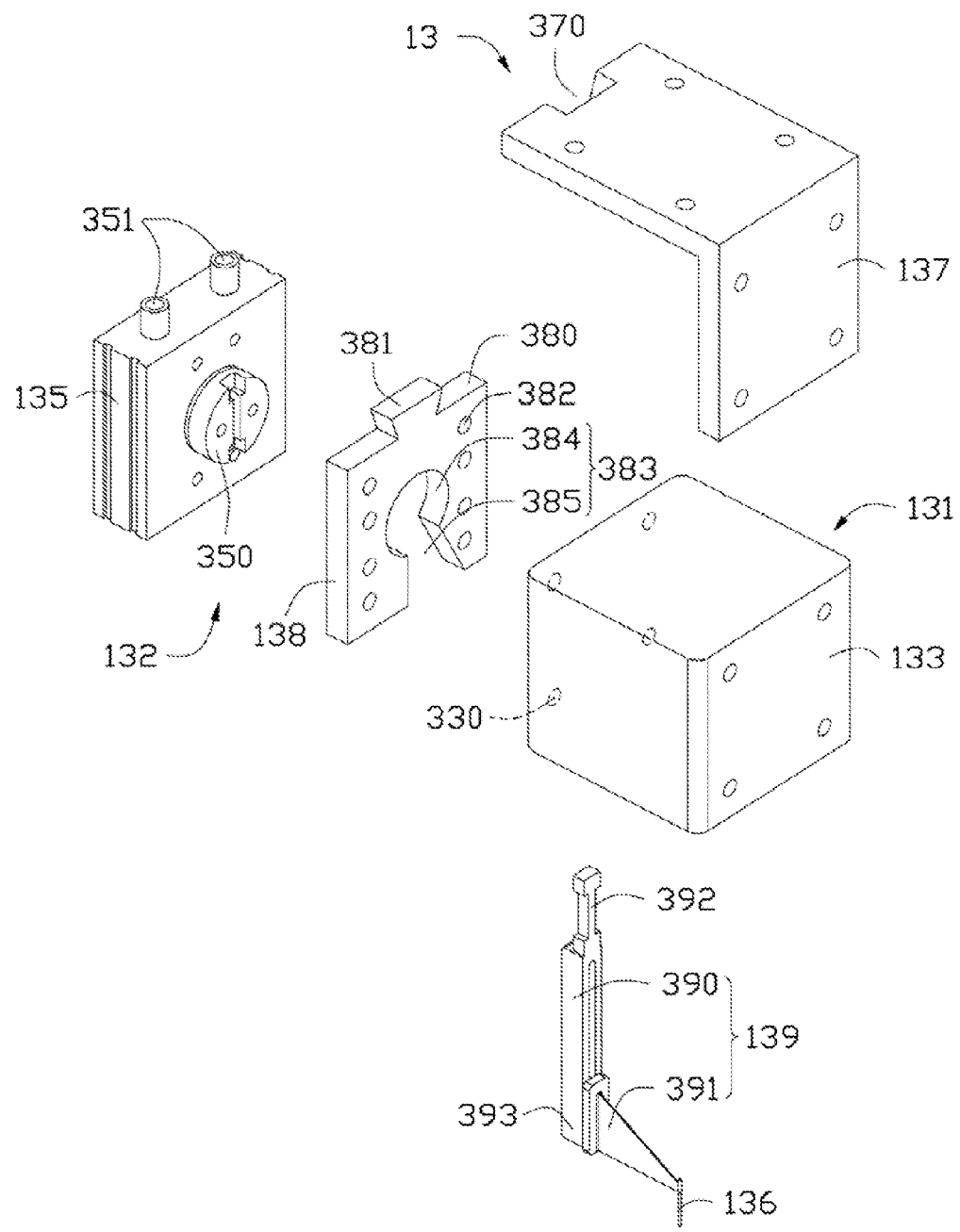
FIG. 3 is an exploded view of the detecting unit of FIG. 2, showing the detecting unit in a first state.
Figure 4:
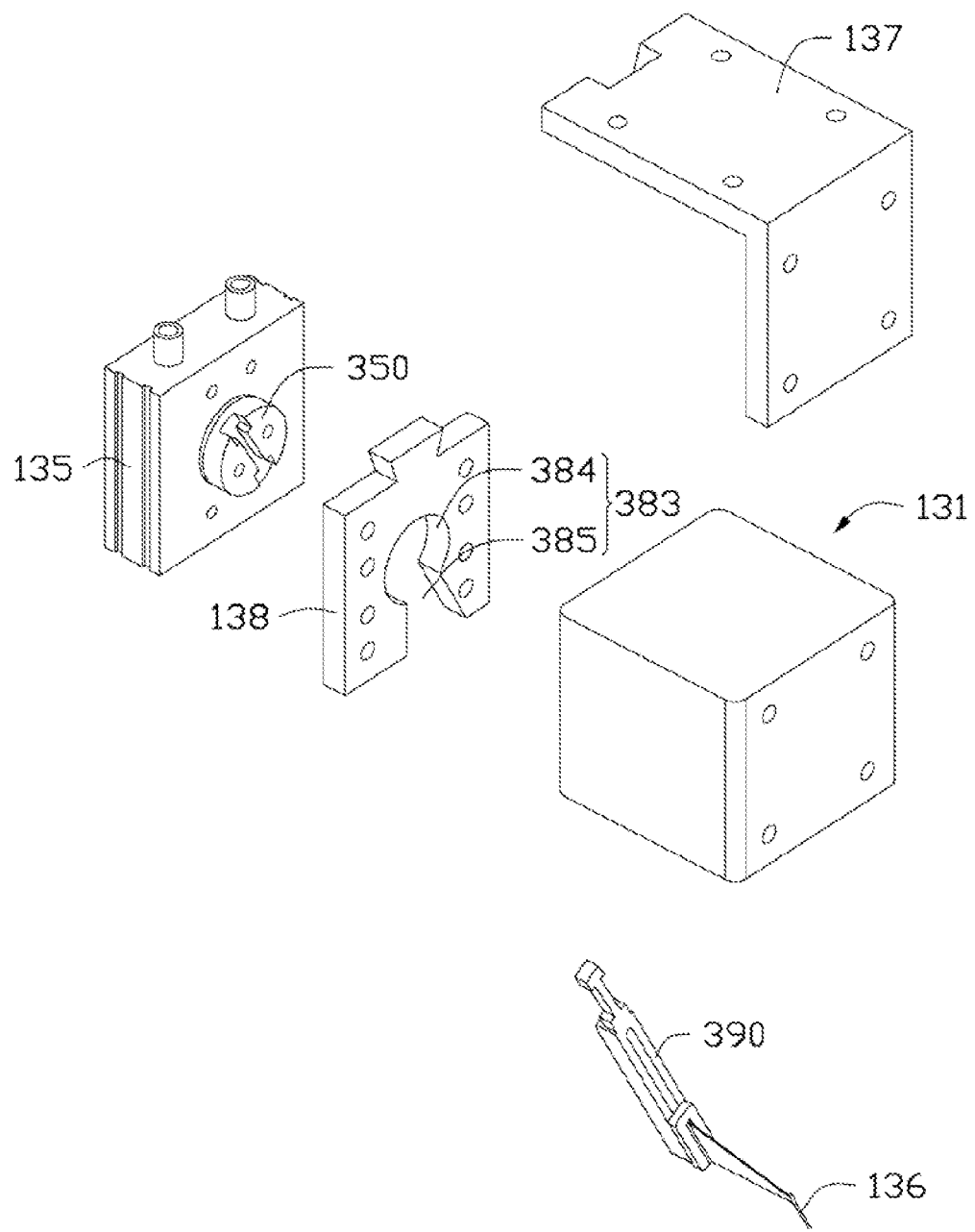
FIG. 4 is similar to FIG. 3, but showing the detecting unit in a second state.

Referring to FIGS. 1-4, a detecting device 100, according to an exemplary embodiment, includes a robot arm 10, an image capture control system 20, a robot arm movement control system 30 and a testing system 40.

The robot arm 10 includes a support arm 11, an adjusting rod 12 and a detecting unit 13.

The support arm 11 includes a first arm 111 and a second arm 112 connected to the first arm 111. The first arm 111 is substantially L-shaped. A first actuator (not shown) may be received in the bottom end (bottom 113) of the first arm 111 and a second actuator (not shown) may be received in the other end (end 114) of the first arm 111. The first actuator and the second actuator are controlled by the detecting device 100 and move the first arm 111 and the second arm 112 as required. The detecting device 100 may include control circuits/chips to implement the control of the first actuator and the second actuator. The second arm 112 is connected to the end 114 of the first arm 111 using two swinging arms 115.

The adjusting rod 12 rotatably extends through the second arm 112. The second arm 112 defines a threaded hole 117 at the distal end (end 116) of the second arm 112. The adjusting rod 12 includes a threaded body 121 and a connecting plate 122. The threaded body 121 is threaded through the threaded hole 117. The connecting plate 122 is connected to a lower end of the threaded body 121. When the threaded body 121 is rotated, the connecting plate 122 is moved up or down.

The detecting unit 13 is attached to the connecting plate 122 and includes an image capture device 131 and a probe device 132.

The image capture device 131 is configured to capture images of a workpiece. The image capture device 131 may be an auto-focus capture device. The image capture device 131 includes a housing 133, a lens unit (not shown) and an image sensor (not shown) received in the housing 133. The lens unit is mounted on the housing 133.

The probe device 132 includes a driving device 135, a probe 136, a connecting member 137, restriction member 138 and a probe support 139.

The connecting member 137 is substantially L-shaped and is attached to the housing 133 of the image capture device 131 and the connecting plate 122 by screws or glue. The connecting member 137 defines a wedge-shape opening 370 at an edge thereof.

The restriction member 138 is engaged with the connecting member 137. The restriction member 138 includes a protrusion 381 shaped and sized to fit into the opening 370. The protrusion 381 is received in the opening 370 so that the restriction member 138 dovetails with the connecting member 137. The housing 133 defines a number of housing threaded holes 330. The restriction member 138 defines a number of member threaded holes 382 each corresponding to a housing threaded hole 330. A bolt (not shown) extends through the housing threaded hole 330 into the member threaded hole 382 to further secure the restriction member 380.

The restriction member 138 defines a restriction opening 383 at the center thereof. The member threaded holes 382 flank the restriction opening 383. The restriction opening 383 includes a rotation hole portion 384 and a restriction hole portion 385 in communication with the rotation hole portion 384. The rotation hole portion 384 is substantially round. The width of the restriction hole portion 385 tapers outwards, that is to say increases from the center of the restriction member 138 to the lower edge of the restriction member 138.

The probe support 139 holds the probe 136 and is mounted to the driving device 135. The support 139 includes a rotation arm 390 and a support arm 391. The rotation arm 390 includes a coupling end 392 and a connecting end 393 at opposite sides of the rotation arm 390. The coupling end 392 is secured on the driving device 135. The support arm 391 is connected to the connecting end 393 and holds the probe 136. A portion of the rotation arm 390 between the coupling end 392 and the connecting end 393 is received in the restriction hole portion 385.

The driving device 135 is secured on a side of the restriction member 138 facing away from the image capture device 131 so that the driving device 135 is mounted on the image capture device 131. The driving device 135 includes a coupling portion 350 engaging with the coupling end 392. The coupling portion 350 is substantially round and extends through the rotation hole portion 384. In this embodiment, the driving device 135 includes a solenoid valve (not shown) and two air ports 351 for connecting to a regulated gas supply. The solenoid valve is configured to control gas flows from the gas supply, thereby controlling the rotation of the coupling portion 350. It is to be understood that in alternative embodiments, the driving device 135 may include step motors, voice coil motors, piezoelectric motors etc. to move the probe support 139 and the probe 136. It is also to be understood that in alternative embodiments, the restriction member 138 can be omitted and the driving device 135 may be directly mounted on a side of the image capture device 131.

The probe 136 is configured to generate testing signals associated with the workpiece. The probe 136 may take various forms. For example, if voltage and/or conductivity of the workpiece are/is needed to be detected, the probe 136 may include a conductor which is elastic, such as a metallic spring. If the temperature of the workpiece is needed to be detected, the probe 136 may include a thermocouple to contact the workpiece.

The image capture control system 20 is electrically connected to the image capture device 131 and is configured to control the image capture device 131 to capture images of the workpiece. The images of the workpiece may be outputted to a display terminal and displayed. The robot arm movement control system 30 is electrically connected to the first actuator, the second actuator and the driving device 135 of the robot arm 10 and is configured to control the movement of the robot arm 10, for example, to control the movement of the first arm 111, the second arm 112, the probe support 139 and/or the adjusting rod 12.

The testing system 40 is electrically connected to the probe 136 and is configured to receive the testing signals from the probe 136, such as the voltage and/or conductivity of the workpiece, the temperature of the workpiece, and configured to compare the data with reference data, and configured to display the data and related results on the display terminal.

Figure 5:
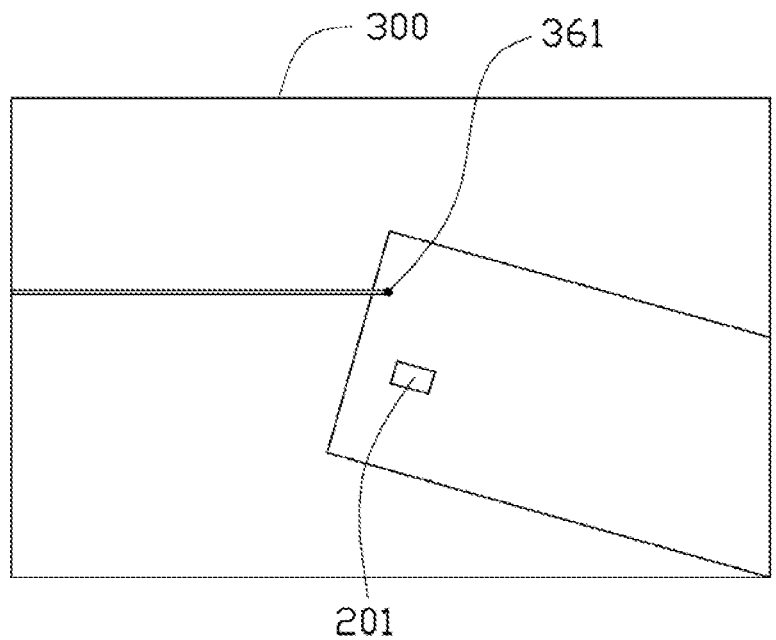
FIG. 5 is a schematic view of a first image captured by the detecting device of FIG. 1.
Figure 6:
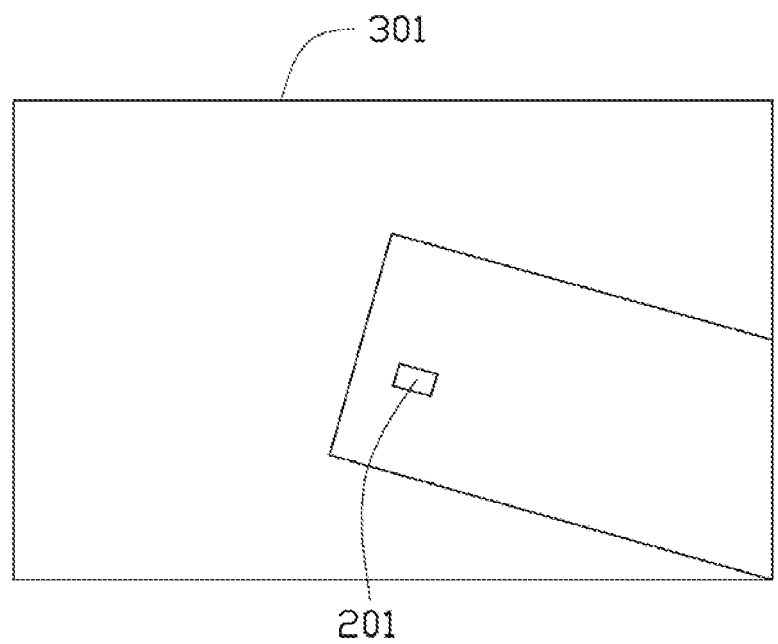
FIG. 6 is a schematic view of a second image captured by the detecting device of FIG. 1.

When in use, the movement control system 30 controls the driving device 135 to move the probe 136 to one side of the lens unit, i.e., the probe 136 is positioned at a first position where the probe 136 does not visually prevent images of the workpiece being captured by the image capture device 131. This can be understood as follows. In a first situation: referring to FIGS. 4 and 5, the image capture device 131 captures an image 300 (which can be seen on the display terminal). The image 300 contains a workpiece image portion 201 and a probe image portion 361. The workpiece image portion 201 is formed by capturing a desired portion of the workpiece. The probe image portion 361 is formed by capturing the probe 136. The workpiece image portion 201 does not overlap the probe image portion 361. In a second situation: referring to FIGS. 4 and 6, the image capture device 131 captures an image 301 (which can be seen on the display terminal). The image 301 contains a workpiece image portion 201 and does not contain a probe image portion. The workpiece image portion 201 is formed by capturing an image of the workpiece.

Then, the adjusting rod 12 is manually or automatically lowered or raised, to move the image capture device 131 so as to have the workpiece precisely focused for the benefit of the image capture device 131. The image capture control system 20 controls the image capture device 131 to focus or refocus on the workpiece and obtain the image 300 containing a clear and distinct workpiece image. The distinct workpiece image includes the workpiece image portion 201. The image capture control system 20 determines the difference between the center of the image 300 and the workpiece image portion 201. The movement control system 30 automatically moves the robot arm 10 according to the difference, causing the center of the image 300 to be located on the workpiece image portion 201. It is to be understood that in alternative embodiments, a user may set a number of parameters for the movement control system 30 in a visual user interface, and the movement control system 30 may automatically, or semi-automatically, move the robot arm 10 to center image 300 on the workpiece image portion 201.

Figure 7:
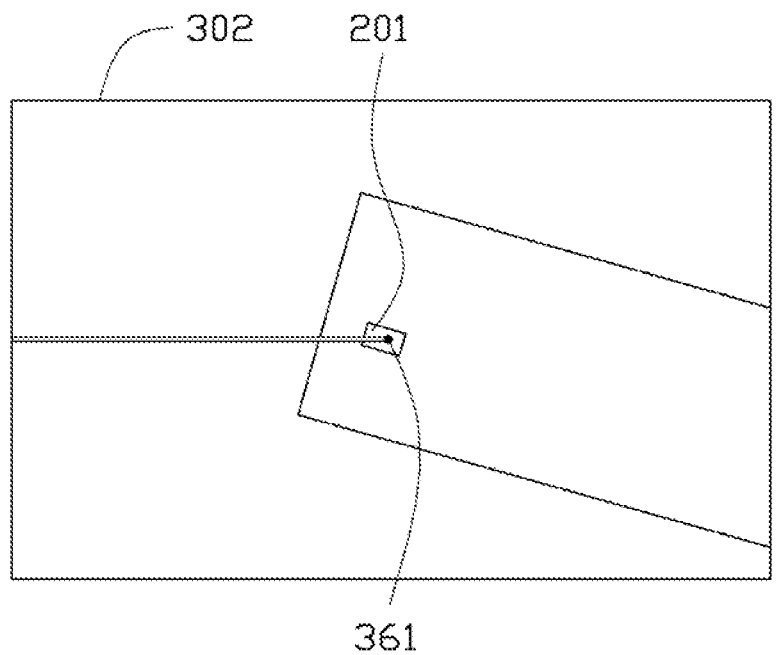
FIG. 7 is a schematic view of a third image captured by the detecting device of FIG. 1.

Then, the movement control system 30 controls the driving device 135 to cause the probe 136 to be repositioned in front of the image capture device 131, i.e., the probe 136 is positioned at a second position where the probe 136 visually does block the images of the workpiece being captured by the image capture device 131. This can be understood as follows. Referring to FIG. 7, the image capture device 131 captures an image 302 (which can be seen on the display terminal). The image 302 contains the workpiece image portion 201 and the probe image portion 361. The probe image portion 361 is located on the workpiece image portion 201. In this way, when an image of the workpiece is needed, the probe 136 can be moved aside and does not visually block the image of the workpiece from the image capture device 131. When workpiece-detection is needed, the probe 136 can be moved in front of the image capture device 131 and make contact with the desired portion of the workpiece. It is to be understood that in alternative embodiments, the driving device 135 may drive the probe 136 to move substantially perpendicular to the optical axis of the lens unit within a particular and predetermined range.

The adjusting rod 12 is can be lowered or raised manually or automatically to cause the probe 136 to make contact with the relevant point or portion of the workpiece. Then, the testing system 40 obtains the data from the probe 136.

The system of control, and the image capturing ability of the robot arm 10 may be not limited to those disclosed in the present disclosure. The control and image capturing ability of the robot arm in related art can also be used in the present disclosure.

Even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A robot arm, comprising:
a support arm;
an adjusting rod rotatably extending through the support arm; and
a detecting unit attached to the adjusting rod, the detecting unit comprising an image capture device and a probe device, the image capture device configured to capture images of a workpiece, the probe device comprising a driving device and a probe configured to generate testing signals associated with the workpiece, the driving device configured to drive the probe to move between a first position where the probe does not visually prevent the images of the workpiece being captured by the image capture device, and a second position where the probe visually does block the images of the workpiece being captured by the image capture device.

2. The robot arm of claim 1, wherein the support arm comprises a first arm and a second arm connected to the first arm, the adjusting rod rotatably extending through the second arm.

3. The robot arm of claim 1, wherein the probe device further comprises a connecting member, a restriction member and a probe support, the connecting member attached to the image capture device and connected to an end of the adjusting rod distal from the second arm, the restriction member dovetailing with the connecting member and configured to restrict movement of the probe, the probe support holding the probe and coupled to the driving device, the driving device configured to rotate the probe support, thereby causing the probe to move between the first position and the second position.

4. The robot arm of claim 3, wherein the probe support comprises a rotation arm and a support arm, the rotation arm comprising a coupling end and a connecting end at opposite sides thereof, the coupling end secured on the driving device, the support arm connected to the connecting end and holding the probe.

5. The robot arm of claim 4, wherein the driving device comprises a coupling portion coupled to the coupling end.

6. A detecting device, comprising:
 a robot arm, comprising:
  a support arm;
  an adjusting rod rotatably extending through the support arm; and
  a detecting unit attached to the adjusting rod, the detecting unit comprising an image capture device and a probe device, the image capture device configured to capture images of a workpiece, the probe device comprising a driving device and a probe configured to generate testing signals associated with the workpiece, the driving device configured to drive the probe to move between a first position where the probe does not visually prevent the images of the workpiece being captured by the image capture device, and a second position where the probe visually does block the images of the workpiece being captured by the image capture device;
 an image capture control system electrically connected to the image capture device and configured to control the image capture device to capture the images of the workpiece;
 a robot arm movement control system electrically connected to the robot arm and configured to control the movement of the robot arm; and
 a testing system electrically connected to the probe and configured to receive the testing signals from the probe.

7. The detecting device of claim 6, wherein the support arm comprises a first arm and a second arm connected to the first arm, the adjusting rod rotatably extending through the second arm.

8. The detecting device of claim 6, wherein the probe device further comprises a connecting member, a restriction member and a probe support, the connecting member attached to the image capture device and connected to an end of the adjusting rod distal from the second arm, the restriction member dovetailing with the connecting member and configured to restrict movement of the probe, the probe support holding the probe and coupled to the driving device, the driving device configured to rotate the probe support, thereby causing the probe to move between the first position and the second position.

9. The detecting device of claim 8, wherein the probe support comprises a rotation arm and a support arm, the rotation arm comprising a coupling end and a connecting end at opposite sides thereof, the coupling end secured on the driving device, the support arm connected to the connecting end and holding the probe.

10. The detecting device of claim 9, wherein the driving device comprises a coupling portion coupled to the coupling end.

* * * * *